United States Patent Office 3,300,541
Patented Jan. 24, 1967

3,300,541
VULCANISABLE MIXTURES AND PRODUCTS
OBTAINABLE THEREFROM
Cyril X. G. Latty, Saint-Cloud, France, assignor to Nobel-Bozel, Paris, France, a company of France
No Drawing. Filed Feb. 23, 1960, Ser. No. 10,062
Claims priority, application France, Mar. 2, 1959, 788,123
6 Claims. (Cl. 260—740)

It has already been proposed to employ certain mixtures on the basis of pure natural rubbers or copolymers of butadiene and styrene freed from impurities for the manufacture of joints, membranes, coatings and similar articles. A feature of the mixtures subjected to vulcanisation is that they are prepared substantially without plasticising oils and without fillers of the carbon black, silica and chalk types, with less than 2% of water and with proportions of sulphur and zinc compounds which are either nil or calculated in such a manner that the final product contains less than 1% of free sulphur and less than 4% of zinc; the mixtures may however contain very pure colloidal barium sulphates in very fine grains as fillers.

It has further been proposed to use, as elastomer the elastomer which is described in Patent No. 2,931,845. The process in question leads to a material having a better resistance to uranium hexafluoride as well as mechanical properties which clearly are superior, particularly as regards hardness, breaking strength, moduli, etc. The vulcanised product should satisfy the following conditions:

(a) the necessary content of combined nitrogen of from 0.8 to 10%;
(b) water content less than 2%;
(c) free sulphur content nil or less than 1% and the zinc content nil or less than 4%. The mixtures to be vulcanised must be substantially free from plasticising oils and from conventional fillers; they may contain very pure colloidal barium sulphates in very fine grains.

A feature of the vulcanisable mixtures forming the object of the present invention is that they contain, in addition to the ingredients above mentioned an organic peroxide in a quantity not exceeding substantially 5% by weight with respect to the elastomer or to the elastomers in the mixture.

The peroxide in such a mixture may be, in particular, benzoyl peroxide, dicumyl peroxide, ditertiary butyl peroxide or chlorobenzoyl peroxide or a mixture of two or more of these peroxides; there is advantage in employing peroxides having a degree of purity of from 90 to 95%.

By reason of its nature, the peroxide fully takes into consideration the above defined prescriptions, since it is not in the group of ingredients which is prohibited or which should only be used sparingly.

A mixture in accordance with the invention therefore comprises, as main constituents, an elastomer or mixture of elastomers of the natural or synthetic rubber type and one or more organic peroxides the weight of which is less than 5% or at the most does not substantially exceed 5% of the weight of the elastomer component, with the reservations that the mixture must contain less than 2% of water, be free of sulphur or contain such a proportion thereof that the vulcanised product contains less than 1% of sulphur in the free state, be free of zinc compounds or contain such a proportion thereof that the vulcanised product contains less than 4% of zinc, and, finally, be substantially free of plasticising oils and of known fillers other than very pure colloidal barium sulphates in very fine grains.

The mixtures in accordance with the invention lend themselves to vulcanisation at the usual temperatures of 143° to 145° C.

In the ease of mixtures which do not contain sulphur and/or bisulphides of tetra-alkyl thiurams, the most suitable proportion of organic peroxides is near to the upper limit of 5% indicated above if it is desired that the time of vulcanisation should not exceed about 2 hours. Thus, in the case of benzoyl peroxide about 5% should be used in relation to the weight of the elastomer component, to obtain a vulcanisation time of 1 to 2 hours. For the same time of vulcanisation, the proportions of dicumyl peroxide is of the order of from 2.5 to 3% if, at the same time, the mixture contains from 0.5 to 1% of an antioxidant; the latter is preferably chosen from amongst those which are only slightly volatile and do not leave any stain in the vulcanised product. In the two cases it is recommended that the mixture contains several percent (in relation to the weight of the elastomer component) of finely powdered quicklime, the latter procuring a completion of stabilisation.

I have discovered that it is possible to shorten the duration of the vulcanisation and simultaneously, to decrease the proportion of the organic peroxides, thus obtaining a double economy, provided that certain of the mixtures described in the first two paragraphs of this specification are taken as the basis; the mixtures in question are those which contain sulphur and/or one or more bisulphides of tetra-alkyl thiurams within the limits recited above, that is to say the limits imposed by the maximum admissible amount of free sulphur in the vulcanised product. The invention comprises more particularly the mixtures prepared in consideration of this discovery.

It has been found advantageous to employ as anti-oxidants, especially in the case of the mixtures lastly in question, compounds of the class of 2,2′-alkylene-bis-(4-alkyl-6-tertiary butyl-phenols).

The elastomer in the mixture may be pure natural rubber, a copolymer of butadiene and styrene freed of impurities, synthetic poly-isoprene (Ameripol SN or Coral-Rubber), Perbunan, neoprene, or a carboxylic rubber. However, the preferred elastomer is that made in accordance with the specification of U.S. Patent No. 2,931,845, either alone or in admixture with one or more of the other elastomers mentioned above.

If the mixture contains the elastomer prepared from rubber, protein and aldehyde in conformity with U.S. Patent No. 2,931,845, it is recommended that the constituents of this mixture be proportioned so that after vulcanisation the combined nitrogen content of the product obtained is from 0.8 to 10% by weight.

The sulphur, if present in the mixture, may be insoluble sulphur, colloidal sulphur or a similar sulphur.

The bisulphide of tetra-alkyl thiuram comprises short alkyl chains and may be, in particular, the bisulphide of tetra-methyl thiuram or the bisulphide of tetra-ethyl thiuram or a higher homologue.

A 2,2-alkylene-bis-(4-alkyl-6-tertiarybutyl-phenol) is a compound with short alkyl and alkylene chains; this may be more especially 2,2′-methylene-bis-(4-methyl-6-tertiarybutyl-phenol) known under the name "Antioxidant 2246," or 2,2′-ethylene-bis-(4-ethyl-6-tertiarybutyl-phenol) known under the name "Antioxidant 425," or a similar product. The preparation of an intimate mixture of the elastomer with the peroxide and the other ingredients may be effected by known processes: for example, after plasticising the elastomer by kneading, the peroxide and the other ingredients are also incorporated in the kneader.

The introduction into the mould and the moulding are then carried out according to customary processes, and, finally, vulcanisation is effected, for example by means of a heated plate press.

More particularly the mixtures forming the object of the invention may contain relatively small proportions of peroxide (for example 1 to 1.5 parts per 100 parts of the elastomer), a small proportion (for example 0.2 to 0.6 part per 100 parts of elastomer) of sulphur, a bisulphide of tetra-alkyl thiuram or a mixture of these two as well as a small proportion (for example 0.2 to 0.3 part) of an antioxidant of the 2,2'-alkylene bis-(4-alkyl-6-tertiary-butyl-phenol) type.

With such mixtures there are obtained, at a normal vulcanisation temperature of 143° to 145° C., at the end of a period scarcely exceeding 1 hour, vulcanisation effects which, by the customary processes, may only be produced with much larger proportions of peroxide, all conditions being otherwise equal, or even effects which can only be obtained with the simultaneous use of greater proportions of peroxide and longer periods of vulcanisation.

According to another feature of the invention, the vulcanisation may be followed by a treatment in an autoclave for example with live steam under low pressure, by means of which it is possible to reduce the duration of vulcanisation in the press at 143° to 145° C. to a time much less than one hour. Thus this duration may be limited to about a quarter of an hour by effecting a subsequent treatment in an autoclave with live steam under a pressure of 3 kg. per sq.cm.

The decrease in the proportion of peroxide realisable according to the invention evidently allows a decrease of the subsequent release of gas when the product is under vacuum, for example where a packing or joint made therefrom is in an evacuated enclosure or piping, which is an important point in practice. In addition according to another feature of the invention, the vulcanisation may be effected under vacuum, which practically eliminates the necessity for subsequently degassing the product.

The invention also makes it possible to avoid the use as vulcanisation ingredients of complementary activators, such as particularly zinc oxide, a mineral product the presence of which it is desirable to reduce to a minimum in a material which must resist gaseous fluoric compounds.

The present invention thus contributes an important technical advance in the field of joints with high resistance to gaseous fluor compounds since it renders much more economic and is much more adapted to the exigencies, vulcanisation with organic peroxides; decrease of the proportion of peroxide; decrease of the subsequent degassing; decrease of the durations of vulcanisation; decrease of the proportions of mineral additions such as ZnO; uselessness of adding quicklime as stabiliser, etc.

There will now be given, in an illustrative but non-limitative sense, several examples of the composition of mixtures conforming to the invention; the parts are by weight; the elastomers used in these examples are as follows:

(1) Elastomer prepared according to U.S. Patent No. 2,931,845.

(2) Elastomer prepared according to U.S. Patent No. 2,931,845.

(3) Elastomer prepared according to U.S. Patent No. 2,931,845.

(4) Mixture of 50%, by weight, of natural rubber and the elastomer prepared according to U.S. Patent No. 2,931,845.

(5) Mixture of 50%, by weight, of Perbunan rubber and the elastomer prepared according to U.S. Patent No. 2,931,845.

(6) Mixture of 50%, by weight, of synthetic poly-isoprene and the elastomer prepared according to U.S. Patent No. 2,931,845.

The elastomer prepared according to U.S. Patent No. 2,931,845 is that which is obtained in accordance with Example 2 of that patent, that is to say in the following manner:

60% natural rubber latex is vigorously stirred into lactic casein, previously dissolved to the extent of 11% in ammonia water containing 6% of commercial ammonia solution at 22° Bé. Into the homogeneous fluid medium obtained, which contains 15 parts of casein to 100 parts of rubber later, glyoxal is then introduced, with continued stirring, to the extent of 2% with respect to the casein. There is produced a reaction which ends in the formation of a gel. The gel is allowed to age for several hours, then it is dispersed under vigorous stirring, in an 8% acetic acid solution, in quantity necessary to provoke flocculation. It is then filtered, washed and dried.

In order to prepare the mixtures 1 to 6 defined above, the elastomer (or mixture of elastomers) is plasticised by kneading and, during the kneading, there are incorporated the ingredients indicated in the table below:

|  | 1 | 2 | 3 | 4 | 5 | 6 |
|---|---|---|---|---|---|---|
| Elastomer | 100 | 100 | 100 | 100 | 100 | 100 |
| Peroxide | 1 | 1 | 1 | 1.2 | 1 | 1 |
| Sulphur |  | 0.25 | 0.20 |  | 0.20 | 0.20 |
| Bisulphide of tetra-methyl thiuram | 0.5 |  | 0.4 | 0.5 |  | 0.4 |
| 2,2'-ethylene-bis-(4-ethyl-6-tertiary-butylphenol) | 0.25 | 0.25 | 0.20 | 0.30 | 0.25 | 0.20 |

Introduction into the mould and the moulding are then proceeded with, according to customary processes, and, finally, vulcanisation is effected at a temperature of 143° to 145° C. during 1 hour, by means of a heated plate press.

So far as the qualities of the vulcanisation products obtained are concerned there will be given below, by way of information, the average characteristics of the vulcanised products prepared according to the present invention, using as elastomer that made in accordance with U.S. Patent No. 2,931,845.

Mechanical properties:
  Shore hardness _____ 61
  Breaking strength (kg./cm.$^2$) _____ 310
  Maximum extension (percent) _____ 590
  Modulus, in kg./cm.$^2$:
    At 300% _____ 65
    At 500% _____ 230

The vulcanised products were also submitted to permanent deformation tests, this factor having a considerable importance when the products in question are used as joints in high vacua in the presence of corrosive fluoric gases. The permanent deformation, in percent, under a variable compresion, was determined during 20 hours at 20° C., on the one hand, and at 70° C., on the other hand; the average results obtained with the vulcanised products obtained according to the invention using an elastomer prepared according to U.S. Patent No. 2,931,845, were as follows—

After 20 hours at 20° C.:
  10% compresion _____ 0
  50% compression _____ 0.3
After 20 hours at 70° C.:
  10% compression _____ 0.2
  50% compression _____ 1.2

Chemical tests of the resistance to fluorine under a vacuum of $10^{-4}$ mm. of mercury were also carried out;

the weight and the mechanical properties were re-determined after the test with fluorine; the average results obtained with the vulcanised products prepared according to the invention, employing an elastomer prepared according to U.S. Patent No. 2,931,845 were as follows.

|  | Before the fluorine test | After the fluorine test |
|---|---|---|
| Percentage increase in weight | | 0.5 |
| Shore hardness | 61 | 59 |
| Breaking strength (kg./cm.$^2$) | 310 | 300 |
| Maximum extension, percent | 590 | 600 |
| Modulus: | | |
| At 300% | 65 | 260 |
| At 500% | 230 | 40 |

Finally it was found that these vulcanised products offered a perfect resistance to uranium hexafluoride under a vacuum as low as $10^{-4}$ mm. of mercury.

The preceding examples have been given solely to illustrate the invention and must not be considered in any way as limiting the invention.

What I claim is:

1. A rubber composition consisting essentially of a rubber selected from the group consisting of natural rubber, and synthetic rubbery polymers of at least one compound selected from the group consisting of conjugated diolefins and chloroprene; about 1 to 1.5% by weight of the rubber of at least one organic peroxide; at least one vulcanizing agent selected from the group consisting of sulfur, tetra-lower-alkyl thiuram bisulphides, and mixtures thereof, the amount of said vulcanizing agent being from about 0.2 to 0.6% by weight of the rubber; said composition being substantially free of water, zinc, plasticing oils, carbon black, silica, and chalk fillers.

2. The composition of claim 1, wherein said vulcanizing agent is tetra-lower-alkyl thiuram bisulphide in an amount ranging from about 0.2 to about 0.6% by weight of the rubber, any remainder of said vulcanizing agent being in the form of elemental sulphur.

3. The mixture of claim 1, further containing a 2,2'-lower-alkylene bis-(4-lower-alkyl-6-tertiary-butyl-phenol) in an amount of from 0.2 to about 0.3% by weight of the rubber.

4. The mixture of claim 1, said organic peroxide being dicumyl peroxide.

5. The mixture of claim 1, said rubber comprising a compound of rubber, protein and aldehyde prepared from latex.

6. Process for vulcanizing the composition of claim 1, which comprises the steps of heating the composition in a press at a temperature of from about 143° C. to about 145° C. for a period of less than an hour, to effect partial vulcanization thereof, then autoclaving said composition in low pressure live steam to complete the vulcanization thereof.

References Cited by the Examiner

UNITED STATES PATENTS

| 2,335,405 | 11/1943 | Geer | 260—740 XR |
| 2,538,355 | 1/1951 | Davis et al. | 260—45.95 |
| 2,695,328 | 11/1954 | Kendall et al. | 260—733 |
| 2,819,256 | 1/1958 | Boardman | 260—773 |
| 2,868,859 | 1/1959 | Stott | 260—733 |
| 2,909,584 | 10/1959 | Parks | 260—733 |
| 2,931,845 | 4/1960 | Lehmann et al. | 260—8 |

OTHER REFERENCES

Nobel: Latex in Industry, Second Edition (1953), Rubber Age, New York, N.Y., pages 382–383 (2 pages).

Wilson: British Compounding Ingredients for Rubber, Heffer & Sons Ltd., Cambridge, England, pages 10 and 155 (2 pages).

WILLIAM H. SHORT, *Primary Examiner.*

A. M. BOETTCHER, M. STERMAN, L. J. BERCOVITZ, J. NORRIS, C. R. DAVIS, J. ZIEGLER,

*Assistant Examiners.*